United States Patent
Schwartz et al.

(10) Patent No.: US 9,516,943 B2
(45) Date of Patent: *Dec. 13, 2016

(54) LAUNDRY TRANSFER APPARATUS

(71) Applicant: EZ LOAD LLC, Lynbrook, NY (US)

(72) Inventors: David Schwartz, Woodmere, NY (US); Robert Rahmanzada, Valley Stream, NY (US)

(73) Assignee: EZ Load LLC, Lynbrook, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/950,336

(22) Filed: Nov. 24, 2015

(65) Prior Publication Data

US 2016/0075515 A1 Mar. 17, 2016

Related U.S. Application Data

(63) Continuation of application No. 14/299,558, filed on Jun. 9, 2014, now Pat. No. 9,222,215.

(51) Int. Cl.
| | |
|---|---|
| *A47B 5/04* | (2006.01) |
| *D06F 95/00* | (2006.01) |
| *B65G 11/02* | (2006.01) |
| *B65G 11/18* | (2006.01) |

(52) U.S. Cl.
CPC ............... *A47B 5/04* (2013.01); *B65G 11/023* (2013.01); *B65G 11/183* (2013.01); *D06F 95/00* (2013.01); *D06F 95/002* (2013.01)

(58) Field of Classification Search
CPC ...... D06F 95/00; D06F 95/002; B65G 11/183; B65G 11/023; A47B 5/04
USPC ........................................................ 193/1, 2 R
See application file for complete search history.

(56) References Cited

U.S. PATENT DOCUMENTS

| | | | | | |
|---|---|---|---|---|---|
| 2,685,441 | A | * | 8/1954 | Baade ................... | D06F 95/002 177/126 |
| 5,411,164 | A | * | 5/1995 | Smith .................... | A47B 77/02 312/290 |
| 8,763,537 | B2 | * | 7/2014 | Ng ........................ | A47B 5/006 108/35 |
| 8,910,857 | B1 | * | 12/2014 | Hegarty ................ | D06F 95/002 232/1 B |
| 2010/0064543 | A1 | * | 3/2010 | Helot ..................... | D06F 39/12 34/201 |
| 2011/0226641 | A1 | * | 9/2011 | Vensel .................. | A45C 7/0036 206/278 |
| 2013/0319815 | A1 | * | 12/2013 | Kennedy .............. | B65G 11/023 193/32 |

(Continued)

*Primary Examiner* — Gene Crawford
*Assistant Examiner* — Thomas Randazzo
(74) *Attorney, Agent, or Firm* — Stern & Schurin LLP

(57) ABSTRACT

A laundry transfer apparatus comprising a frame within which is disposed a transfer conduit that traverses a distance between the openings of a washing machine and dryer. A plurality of upper extensions are provided to enable the apparatus to rest on the top surfaces of the washing machine and dryer and to vertically suspend the apparatus so that the conduit is appropriately positioned for each use. The conduit preferably comprises a substantially planar surface formed by individual table sections that fold out to form the conduit when the laundry transfer apparatus is in use. The conduit is slidably engaged to the frame via a railing. When use of the laundry transfer apparatus is complete, the individual sections are folded upright and pushed into a retracted position for later use.

20 Claims, 7 Drawing Sheets

(56) References Cited

U.S. PATENT DOCUMENTS

2015/0030261 A1* 1/2015 Mahjoubi ............. D06F 95/004
                                                             383/13
2015/0354129 A1* 12/2015 Schwartz ................ D06F 95/00
                                                             193/2 R

* cited by examiner

LAUNDRY TRANSFER APPARATUS

RELATED APPLICATION

This application is a continuation of application Ser. No. 14/299,558, filed on Jun. 9, 2014, now allowed, which is incorporated herein by reference.

FIELD OF INVENTION

The present invention relates generally to the field of laundry. More specifically, the invention involves a laundry support device that eases the task of laundering clothing. More specifically, the invention relates to a laundry transfer aid for use in connection with relocating laundry between a conventional washing machine and a dryer.

BACKGROUND OF THE INVENTION

The process of transferring laundry from a washing machine to a dryer is frequently unwieldy and cumbersome. In particular, after a washing cycle is complete, wet clothing in a washing machine is often tangled together (typically caused by washing machine spin cycle) leaving a user with a scrambled muddle of clothing that is difficult to handle. When a user aims to transfer wet clothing out of the washing machine and into a dryer, a user typically attempts to grab an entire mound of clothing from the washing machine, hoping to capture every last article. Unfortunately, while most of a load may be successfully transferred into the dryer in a single attempt, a user often finds some pieces of clothing on the floor. This course of events generally requires a user to pick up clothes from the floor, inspect them to determine whether the clothes are sullied and then either place them into the dryer with the clothes that were successfully transferred or re-wash the clothes if they became dirty from making contact with the floor during an unsuccessful transfer to the dryer.

The prior art discloses mechanisms used in connection with the transfer of laundry. However, most are generally inapplicable to laundry operations that utilize a separate washing machine and a separate dryer machine. The prior art also focuses predominantly on commercial laundry transfer operations and mechanisms that are inapplicable to and inappropriate for use with household washing machines and drying machines.

For example, U.S. Pat. No. 5,662,186 covers a commercial shuttle hopper system for loading and unloading commercial washing machines. The system comprises a bucket to receive laundry and includes lift and tilt assemblies to dump the buckets and discharge the laundry into a washer or dryer.

Chinese Patent 202967440 covers a commercial linen conveyor device having shuttle wheels and a drive mechanism that are placed on a support frame with a conveyor belt. The device allows mechanical automatic transfer of linen between a washing machine and the dryer, and eliminates the need for manual transfer.

U.S. Pat. No. 7,404,303 and U.S. Pat. No. 6,978,556 both teach combination washing machines and dryers that allow clothing to drop from a washing machine through a hole positioned beneath the washing machine into a dryer. After the washing machine finishes the cycle, the laundry is automatically transferred by falling to the dryer.

Accordingly, despite the respective benefits of the foregoing prior art systems, there remains a need for a laundry transfer apparatus that eases the task of laundering clothing in connection with household laundry machines.

SUMMARY OF THE INVENTION

In view of the limitations and drawbacks in the prior art, it is a primary object of the present invention to provide a laundry transfer apparatus for use in connection with relocating laundry between a conventional household washing machine and a dryer.

It is another object of the present invention to provide a laundry transfer apparatus that minimizes the incidence of clothing becoming soiled between washing and drying operations.

It is a further object of the present invention to provide a laundry transfer apparatus that also functions as a folding table between a washing machine and dryer.

It is yet another object of the present invention to provide a laundry transfer apparatus that can be used in connection with both side loader and top loader washing machines and dryers.

Another object of the present invention is to provide a laundry transfer apparatus that fits and folds away neatly between a washing machine and a dryer, thereby minimizing the spatial requirements for the apparatus.

Additional objectives will be apparent from the description of the invention that follows.

In summary, there is provided in a preferred embodiment of the present invention a laundry transfer apparatus comprising a rigid frame that forms a casing or exterior sleeve within which is disposed a transfer bridge or conduit that traverses a distance between the openings of a washing machine and dryer. The apparatus further comprises a plurality of wings or support ledges that rest on the top surfaces of the washing machine and dryer, respectively, and sized to help the apparatus straddle the space therebetween. The transfer conduit preferably comprises a substantially planar surface formed by individual table sections that are hingedly attached to a base and which fold out to form the conduit when the laundry transfer apparatus is in use. The conduit may also serve as a folding table after a drying cycle is complete. The base is slidably engaged to the frame via a railing or other conventional sliding mechanism. When the use of the laundry transfer apparatus is complete, the individual table sections are folded upright and pushed inside the exterior sleeve or casing for safe storage. Alternate preferred embodiments of the present invention include a conduit with sections having outer perimeter walls to help prevent clothing from falling to the floor. In another alternate preferred embodiment, the laundry transfer apparatus includes folding or telescoping support legs that support the conduit during use.

Additional features of the laundry transfer apparatus are described below in more detail.

BRIEF DESCRIPTION OF THE DRAWINGS

The above-described and other advantages and features of the present disclosure will be appreciated and understood by those skilled in the art from the following detailed description and drawings of which

DETAILED DESCRIPTION OF THE INVENTION

Figure 1:
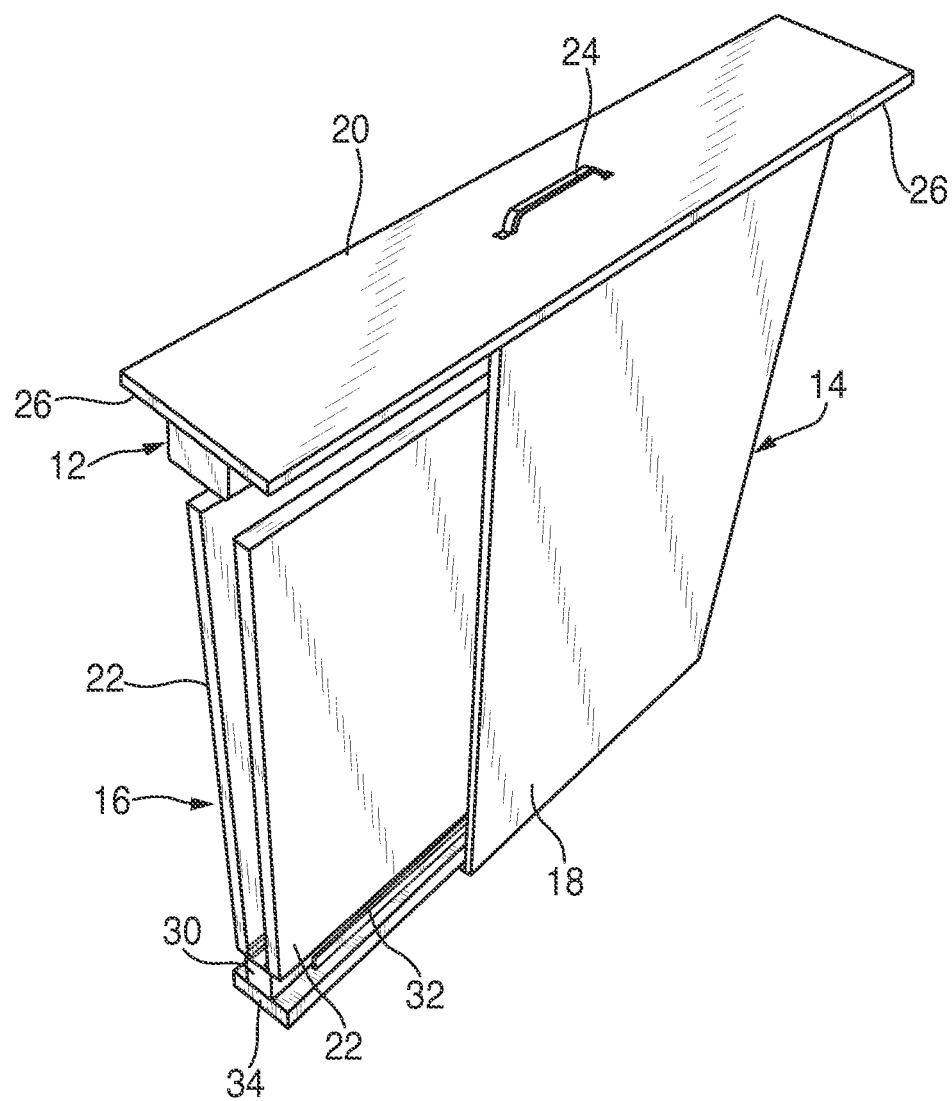
FIG. 1 is a perspective view of a preferred embodiment of the laundry transfer apparatus of the present invention, in a closed or retracted position.

With reference to FIG. 1, FIG. 2, FIG. 6, FIG. 7 and FIG. 8 there is shown a preferred embodiment of the laundry transfer apparatus 10. As shown in FIG. 1, the apparatus 10 comprises a generally rigid frame 12 that forms an exterior casing 14 within which a transfer bridge or conduit 16 is located in a closed and retracted position. The casing 14 comprises lateral walls or partitions 18, a cover 20 and bottom or base 34. A back (not shown) may be provided as well.

Partitions 18 are positioned on either said of the exterior casing 14 and are intended to separate transfer conduit 16 from the sides of the washing machine and dryer between which the apparatus 10 is positioned. Partitions 18 also facilitate the conduit so that it may remain in an upwardly folded and closed position when apparatus 10 is not in use. As shown in FIG. 1, it should be appreciated that partitions 18 are not required to extend fully forward, and thus, conduit 16 may at least partially extend forward beyond the edge of partitions 18, even when conduit 16 is in a fully retracted position.

In a preferred embodiment, partitions 18 are formed of a hard or flexible solid wall to keep dust and dirt from entering the interior of apparatus. However, it should be appreciated and understood that partitions 18 may also be formed utilizing a substantially transparent screen, lattice grating or similar support structure through which the interior of said casing is visible. Partitions may be formed with up to approximately 90% of open surface area in said support structure, if desired. A support structure open surface area is defined as the percent (%) area that is not blocked by the structural members comprising the support structure.

Figure 6:
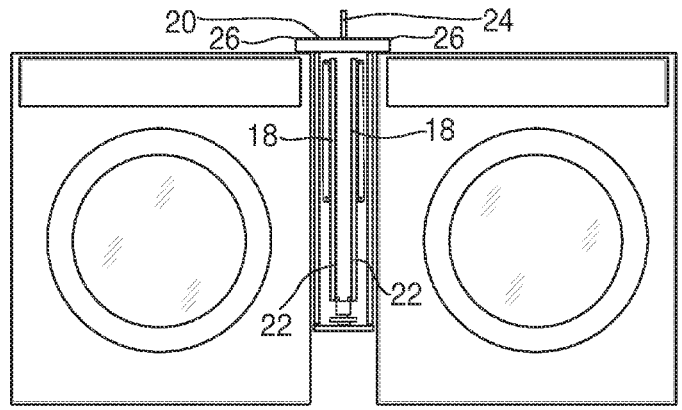
FIG. 6 is a front elevational view of a laundry transfer apparatus in a retracted position vertically suspended between a side loader washing machine and dryer.
Figure 7:
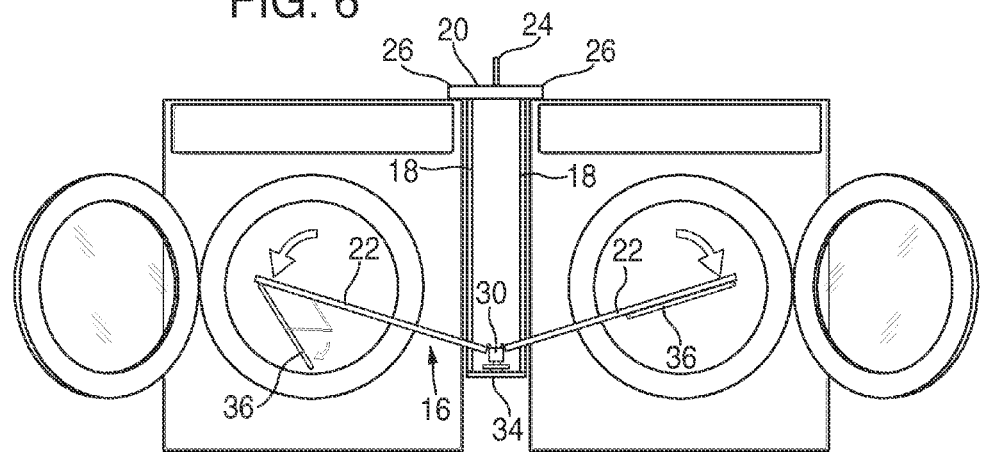
FIG. 7 is a front elevational view of the laundry transfer apparatus in a partially extended position, with the individual sections forming the conduit being unfolded along with the conduit support legs.
Figure 8:
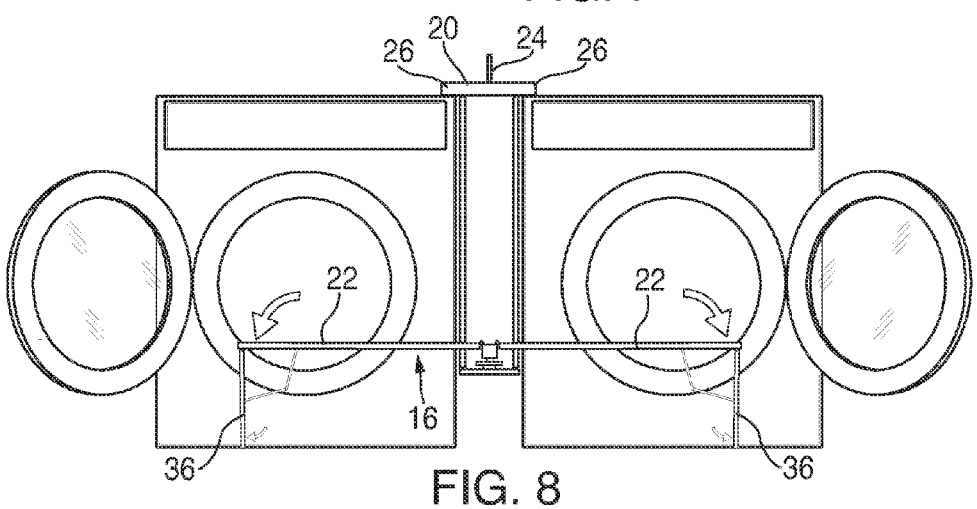
FIG. 8 is a front elevational view of the laundry transfer apparatus in a fully extended position.

In a preferred embodiment, cover 20 is connected to partitions 18 and comprises a handle 24 for carrying apparatus 10 during transport or cleaning thereof. In a preferred embodiment, as best depicted in FIGS. 6 through 8, cover 20 further comprises a pair of upper extensions, wings or support ledges 26 that rest upon the top surfaces of a washing machine and dryer positioned on either side of apparatus 10. Support ledges 26 thus extend laterally beyond partitions 18 and enable partitions 18 to serve as a boundary guard to prevent contact with the interior of casing 14 and transfer conduit 16. Support ledges 26 vertically suspend apparatus 10 at an ideal height enabling conduit 16 to extend into an open, unfolded position at the mouth of a side loading washing machine and side loading dryer. Although extensions, wings or support ledges 26 are shown in a preferred embodiment to be integrally formed with cover 20, it should be appreciated and understood that extensions, wings or support ledges may be incorporated and attached as part of apparatus 10, but separate from cover 20. For example, one or more extensions may be appended at a given height along partition 18 to vertically suspend apparatus 10.

Transfer conduit 16 is comprised of individual, substantially planar table sections 22 that are each attached to a first spine or sliding support member 30. In a preferred embodiment, transfer bridge or conduit 16 and its substantially planar sections 22 are attached by hinged connectors 28 to sliding support member 30. Sliding support member 30 is slidably engaged to frame 12 and casing 14 via conventional sliding rail 32, typically utilized in sliding drawers and the like. As shown in FIG. 1, sliding rail 32 is positioned between sliding support member 30 and base 34 that is also slidably connected to frame 12, thus providing for multiple railing extensions which together may bear the weight of the extended transfer conduit 16 (with and without clothing). In an alternate preferred embodiment, a base 34 may be rendered immobile by fixedly fastening it to partitions 18, as depicted, for example, in FIG. 7. In such an embodiment, an intermediate sliding support and railing may be placed between sliding support member 30 and base 34, if additional extension members are desired beyond the length provided in connection with sliding support member 30. In a further alternate embodiment, sliding rails may be provided on the interior side of partitions, and sliding support member 30 (or intermediate sliding supports) may be slidably engaged to the partitions utilizing sliding rails.

Figure 2:
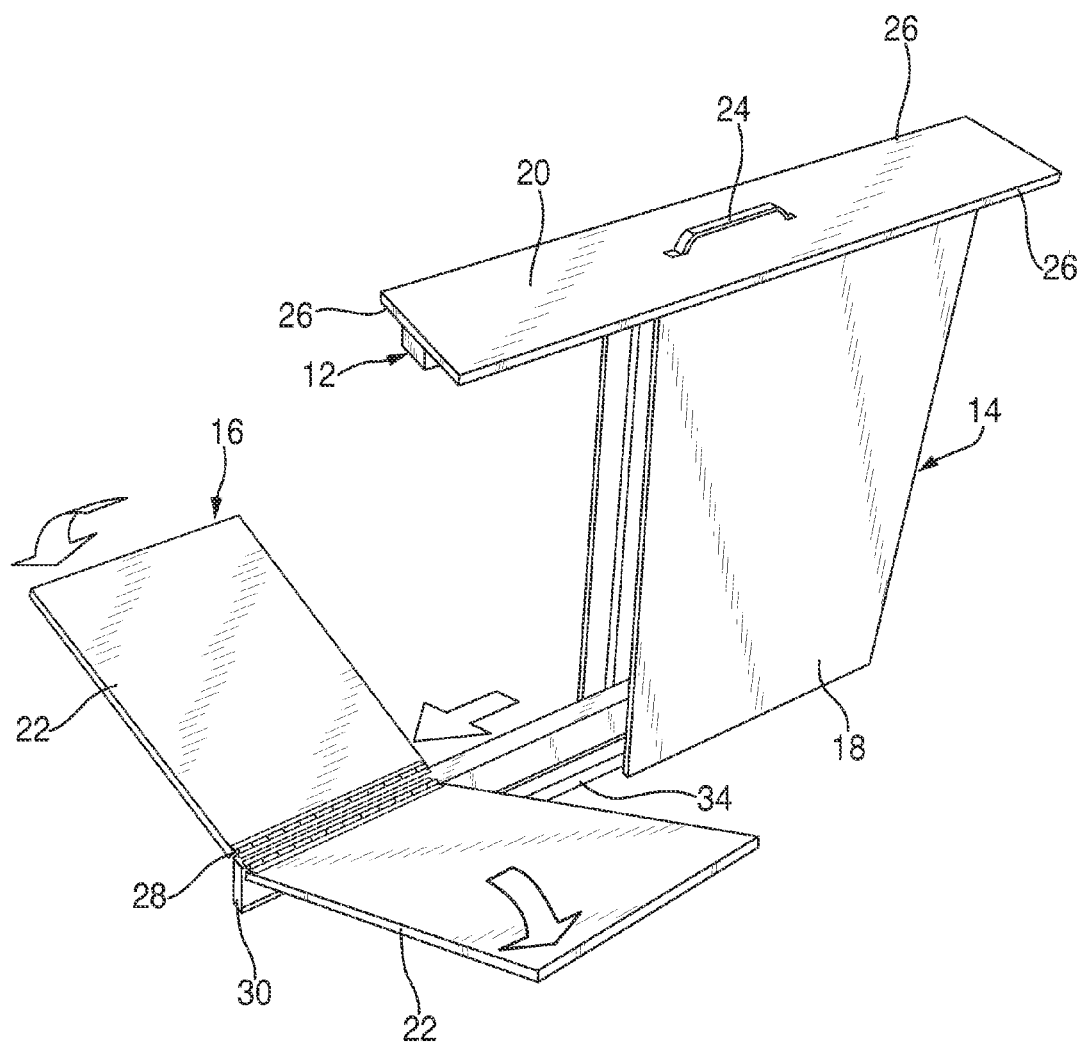
FIG. 2 is a perspective view of the laundry transfer apparatus with the sliding support member or spine in an extended position and the conduit in a partially open position.

An alternate configuration for shifting the transfer conduit from a retracted position to an extended position is to provide a pivot point or pin (in the central rear vicinity of the transfer conduit) around which the transfer conduit may rotate forward 90 degrees into position substantially similar to that shown in FIG. 2. After use is complete, the table sections of the transfer conduit are folded back into place and the entire conduit with its table sections is rotated in the reverse 90 degrees, rearward into a retracted position.

As shown in FIG. 2 and FIG. 7, when apparatus 10 is in use, transfer conduit 16 is pulled from its retracted position into an extended position outside frame 10, forward of the face of washing machine and dryer. After transfer conduit 16 extends forward, table sections 22 pivot down and outward from their upright folded positions. A latch and chain may be provided to prevent table sections 22 from falling outward automatically and away from one another once they clear the front of the washing machine and dryer. Alternatively, to prevent a sudden unfolding of table sections, a hydraulic or 'soft-close' adapter or hinge may be provided in place of the conventional hinge depicted in the figures.

Significantly, as shown in FIG. 8, care should be taken so that the length of each of table sections 22 are not too long, whereby the door(s) of the washing machine and/or dryer may prevent table sections 22 from falling flat. Furthermore, each of table sections 22 must also be of sufficient length to that each extends laterally at least across a majority of the openings of a typical side loader washing machine and dryer, and most preferably span at least 75% of each of the washing machine and dryer openings. The greater the span of the conduit (from left to right), the lower the likelihood that laundry removed from a washing machine will fall to the ground prior to placement in the dryer. By the same token, transfer conduit 16 should be vertically positioned such that the openings of each of the washing machine and dryer are more than 50% accessible and preferably more than 75% accessible. In that regard it is most preferably for conduit 16 to be positioned low enough along the height of the openings of the washing machine and dryer so as not to interfere with the laundry transfer process. When utilizing a vertically suspended apparatus 10, the height of the conduit 16 is consistently positioned. This allows apparatus to be utilized regardless of whether or not a pedestal drawer is used for both the washing machine and dryer.

Figure 5:
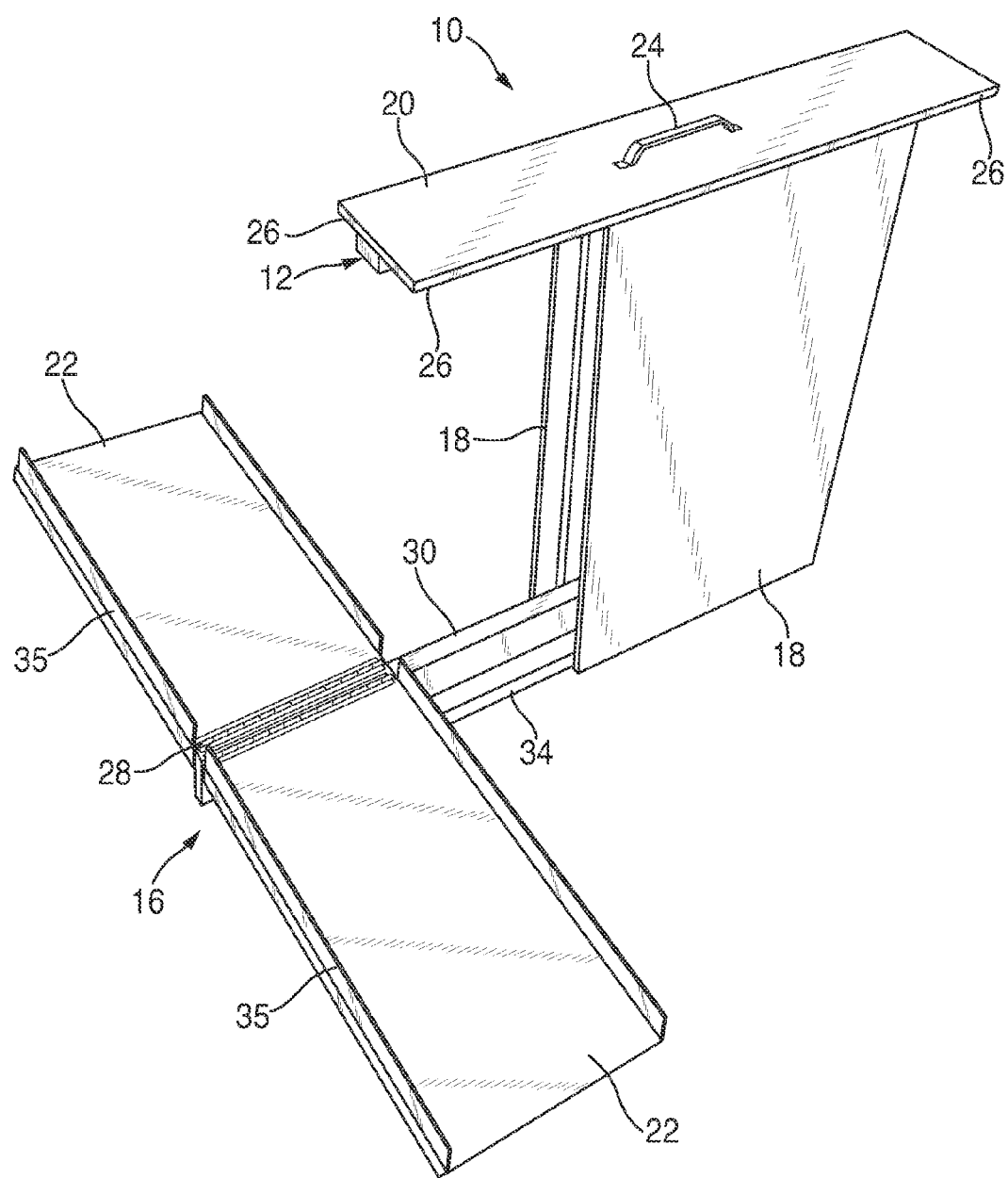
FIG. 5 is a perspective view of a second alternate embodiment of the laundry transfer apparatus with perimeter walls incorporated onto the conduit.

Each table section 22 comprises a width dimension that is preferably in the range of 8 to 16 inches so as to be able to accommodate a complete single load, both during the laundry transfer process as well as to accommodate a complete load of folded laundry after the drying cycle is complete. To help prevent clothing from falling to the floor during the laundry transfer process, perimeter walls 35 may optionally be incorporated at the edges of the table sections 22 of conduit 16, as depicted in FIG. 5. Preferably, perimeter walls 35 are flexible and composed of soft rubber-like material. This feature enables table sections 22 to fold upward without interfering with one another when conduit 16 is retracted and with causing damage to the perimeter walls 35 that come into contact with one another.

During use, apparatus 10 must be positioned sufficiently forward relative to the face or front edge of a washing machine and dryer such that when table sections 22 pivot downward, they do not hit the sides of the washing machine and dryer, and thereby fall just beyond and at the door or mouth of an open side loading washing machine and side loading dryer. As depicted in FIG. 6, FIG. 7 and FIG. 8, table sections 22 are fitted with mechanically folding support legs 36 positioned at the edges of table sections 22. Mechanically folding support legs 36 fold downward and are of sufficient length to reach the floor to support transfer conduit 16 when apparatus 10 is in use for transfer of clothing between washing machine and dryer. When apparatus 10 is not in use, folding support legs 36 remain folded against table sections 22 so that conduit 16 can clear partitions 18 and slide interior of casing 14.

It should further be understood that a transfer conduit may be provided in sliding engagement with a base and then placed and/or secured between a washing machine and dryer so that the transfer conduit may later be extended out from between the washing machine and dryer and then unfolded for use of its table section(s). After use, the table sections are folded back and retracted between washing machine and dryer. In this regard, it should be appreciated that the frame and/or casing depicted in the figures is/are not always required to practice the present invention. Likewise other features (e.g., as the perimeter walls, extension surfaces, support legs) remain optional additions. With an embodiment that does not include a frame or casing, additional weight may have to be provided to stabilize the device so that it does not tip when the transfer conduit is extended out from between the washing machine and dryer. Likewise, if the device (e.g., at the partition walls or base) is sufficiently pressed between (or under) the washing machine and dryer, that may properly serve as a sufficient means to stabilize the device as well.

Figure 3:
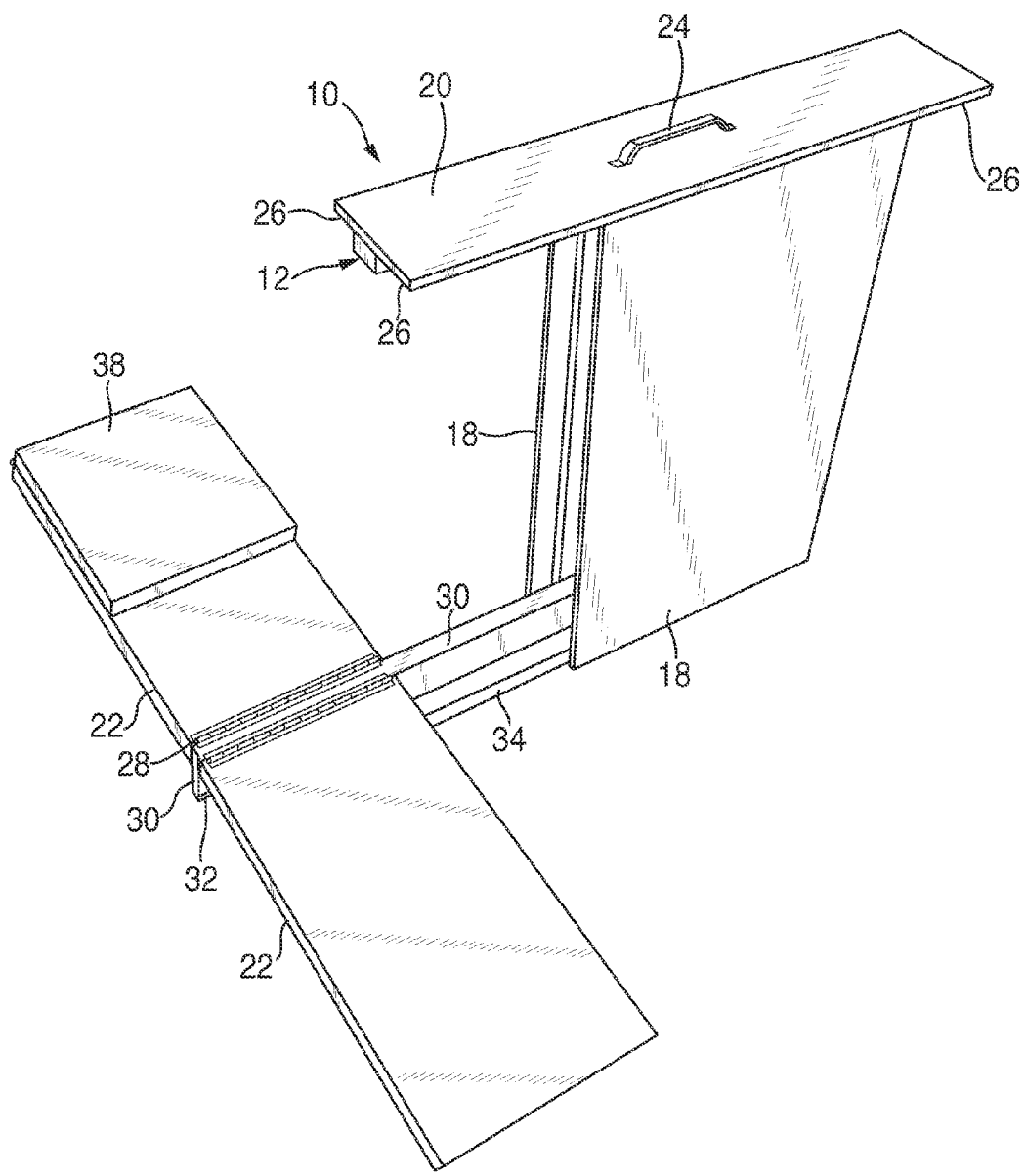
FIG. 3 is a perspective view of a first alternate embodiment of the laundry transfer apparatus with an extension section integrated into the conduit in a folded or closed position.
Figure 4:
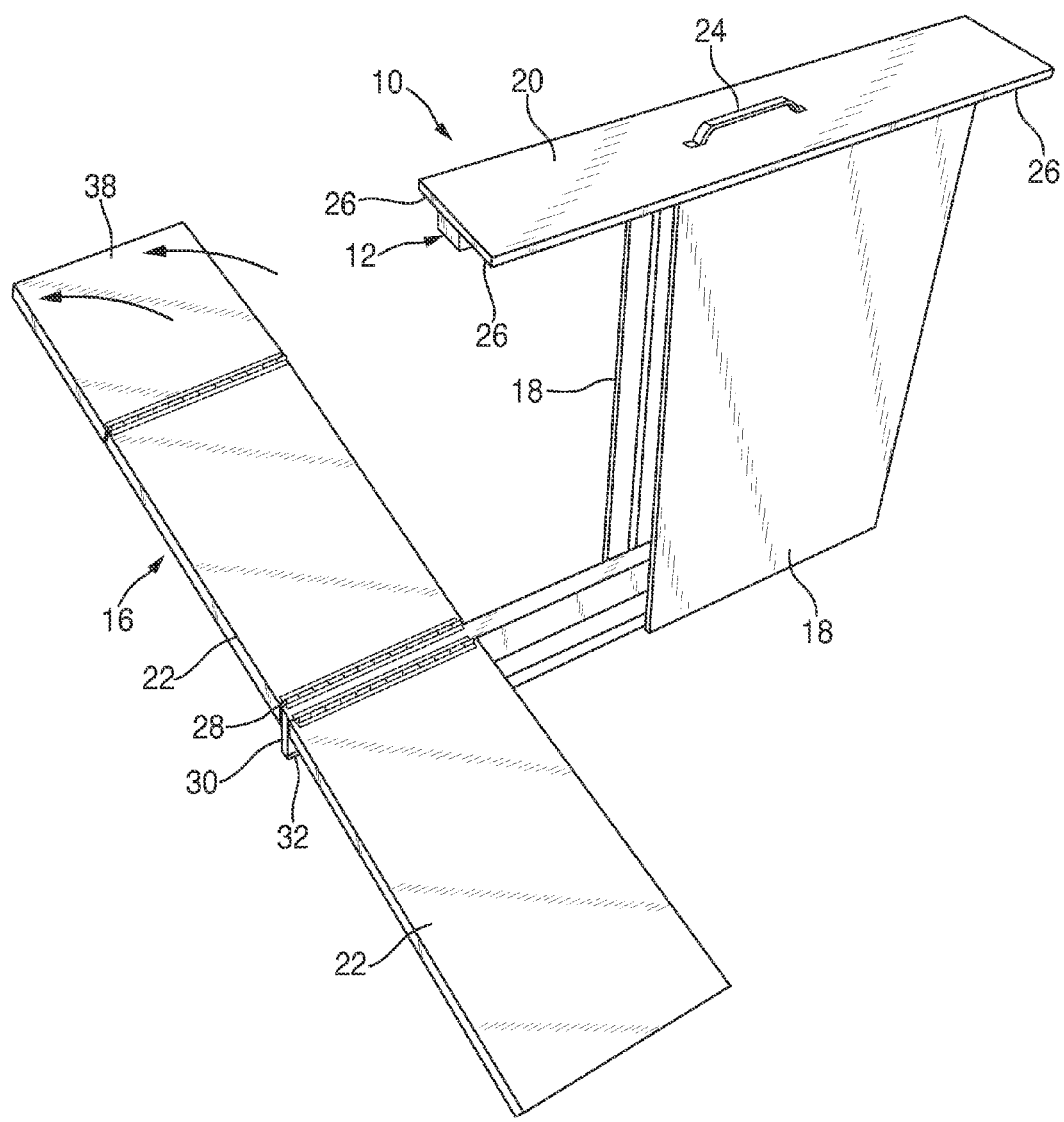
FIG. 4 is a perspective of the alternate embodiment of the laundry transfer apparatus shown in FIG. 3 with the extension section in an unfolded or open position.
Figure 9:
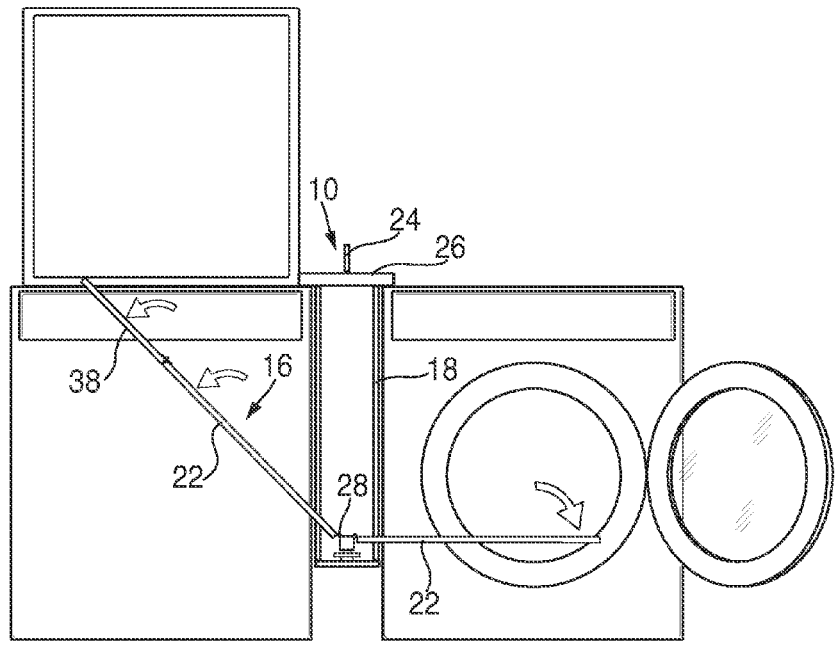
FIG. 9 is a front elevational view of the first alternate embodiment of the laundry transfer apparatus in a fully extended position.
Figure 10:
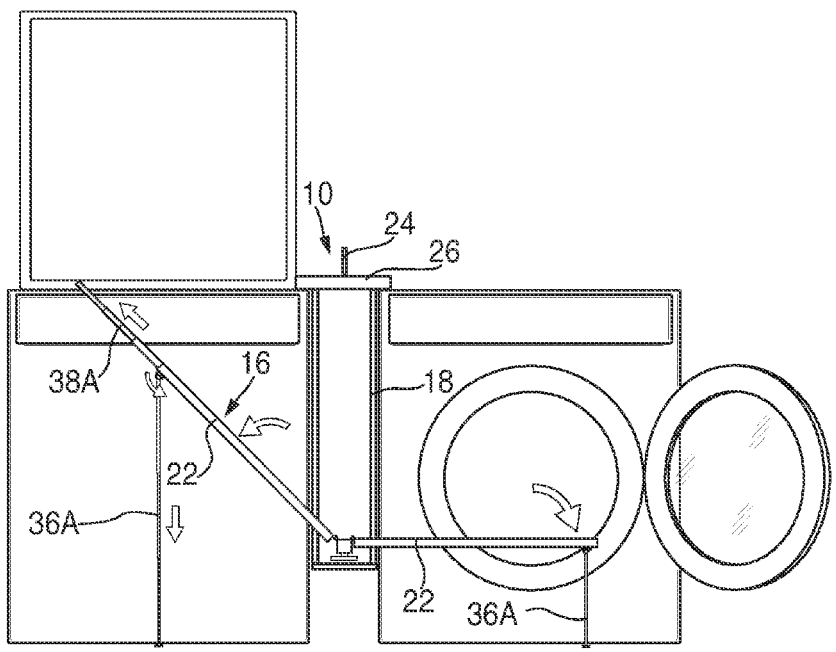
FIG. 10 is a front elevational view of another preferred alternate embodiment of the laundry transfer apparatus in a fully extended position, with a telescoping conduit section and telescoping legs.

With reference to FIG. 3, FIG. 4 and FIG. 9, there is shown another preferred embodiment of the laundry transfer apparatus 10. The primary distinction of this apparatus 10 is the addition of an extension surface 38 which enables apparatus 10 to be utilized with a top loading washing machine. In this embodiment, with the aid of extension surface 38, transfer conduit 16 spans a larger distance to reach the opening of a top loader washing machine, which is positioned on the upper surface of a washing machine, as shown in FIG. 9. While typically fully horizontally oriented, when utilizing a conduit 16 with an extension surface 38, said conduit is slanted enabling laundry to slide down from the opening of the washing machine. Likewise, with reference to FIG. 10, there is shown a further preferred embodiment of the laundry transfer apparatus 10, with an internally retractable, telescoping extension surface 38A. In this embodiment, telescoping, ball jointed support legs 36A are provided in place of folding support legs 36. Although FIG. 9 and FIG. 10 depict an extension surfaces 38, 38A that appear on the left side of the transfer conduit 16, it should be understood that extension surfaces 38, 38A may be provided on either side (or both sides) of transfer conduit 16.

The accompanying drawings only illustrate a preferred embodiments of a laundry transfer apparatus. However, other types and configurations are possible, and the drawings are not intended to be limiting in that regard. Thus, although the description above and accompanying drawings contains much specificity, the details provided should not be construed as limiting the scope of the embodiment(s) but merely as providing illustrations of some of the presently preferred embodiment(s). The drawings and the description are not to be taken as restrictive on the scope of the embodiment(s) and are understood as broad and general teachings in accordance with the present invention. While the present embodiment(s) of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention. It should also be noted that the terms "first," and "second," and similar terms may be used herein to modify various elements. These modifiers do not imply a spatial, sequential, or hierarchical order to the modified elements unless specifically stated.

The invention claimed is:

1. A laundry transfer apparatus for aid in the task of transferring laundry between a washing machine and dryer, comprising:
    a frame;
    a transfer conduit slidably engaged to said frame, said transfer conduit formed from a substantially planar surface;
    wherein said substantially planar surface fold upward and inside said frame when said transfer conduit is in a closed retracted position, and said substantially planar surface fold downward and outside said frame when said transfer conduit is in an open extended position.

2. The laundry transfer apparatus of claim 1, wherein said frame further includes a case formed by said frame.

3. The laundry transfer apparatus of claim 1, wherein said frame further includes a carrying handle.

4. The laundry transfer apparatus of claim 1, wherein said transfer conduit includes a perimeter wall.

5. The laundry apparatus of claim 1, further comprising support legs attached to support the bottom of said transfer conduit when said transfer conduit is in an extended and open position.

6. The laundry apparatus of claim 1, further comprising a railing, wherein said transfer conduit is slidably engaged to said frame via said railing.

7. The laundry transfer apparatus of claim 1, further comprising an upper pair of extensions connected to said frame, said upper pair of extensions configured to rest upon said washing machine and dryer.

8. The laundry transfer apparatus of claim 7, wherein said upper pair of extensions vertically suspend said frame off the ground when said upper pair of extensions rest upon said washing machine and said dryer.

9. The laundry transfer apparatus of claim 1, wherein said washing machine is a top loader washing machine and said plurality of substantially planar surface includes an extending surface to reach the top surface of said top loader washing machine.

10. The laundry apparatus of claim 9, wherein said extending surface is hingedly attached to said substantially planar surface.

11. The laundry apparatus of claim 9, wherein said extending surface slidably extends from said substantially planar surface.

12. A laundry transfer apparatus, comprising:
a frame;
a railing attached to said frame;
a transfer conduit retractably engaged to said frame via said railing, said transfer conduit formed from at least one substantially planar surface;
wherein said at least one substantially planar surface folds upward and inside said frame when said transfer conduit is in a closed retracted position, and said at least one substantially planar surface folds downward and outside said frame when said transfer conduit is in an open extended position.

13. The laundry transfer apparatus of claim 12, wherein said transfer conduit is engaged to said frame via a pivot hinge.

14. The laundry transfer apparatus of claim 12, wherein said transfer conduit comprises a perimeter wall.

15. The laundry apparatus of claim 12, further comprising support legs to support said transfer conduit.

16. A laundry transfer apparatus, comprising:
a rigid frame;
a sliding rail;
a plurality of support ledges for vertically suspending said frame between a washing machine and a dryer;
a transfer bridge connected to said frame, said transfer bridge having at least one substantially planar table section and said transfer bridge being slidably engaged to said frame via said sliding rail.

17. The laundry transfer apparatus of claim 16, wherein when said transfer bridge is in an open position said substantially planar table section is substantially horizontally oriented and when said transfer bridge is in a closed retracted position, said substantially planar table section is substantially vertically oriented.

18. The laundry transfer apparatus of claim 16, further comprising support legs positioned beneath said transfer bridge.

19. The laundry transfer apparatus of claim 16, said substantially planar table section comprising a perimeter wall.

20. The laundry transfer apparatus of claim 16, further comprising partitions attached to said frame, said partitions positioned to maintain said at least one substantially planar table section of said transfer bridge substantially vertical when said transfer bridge is in a closed retracted position.

* * * * *